Patented Mar. 19, 1935

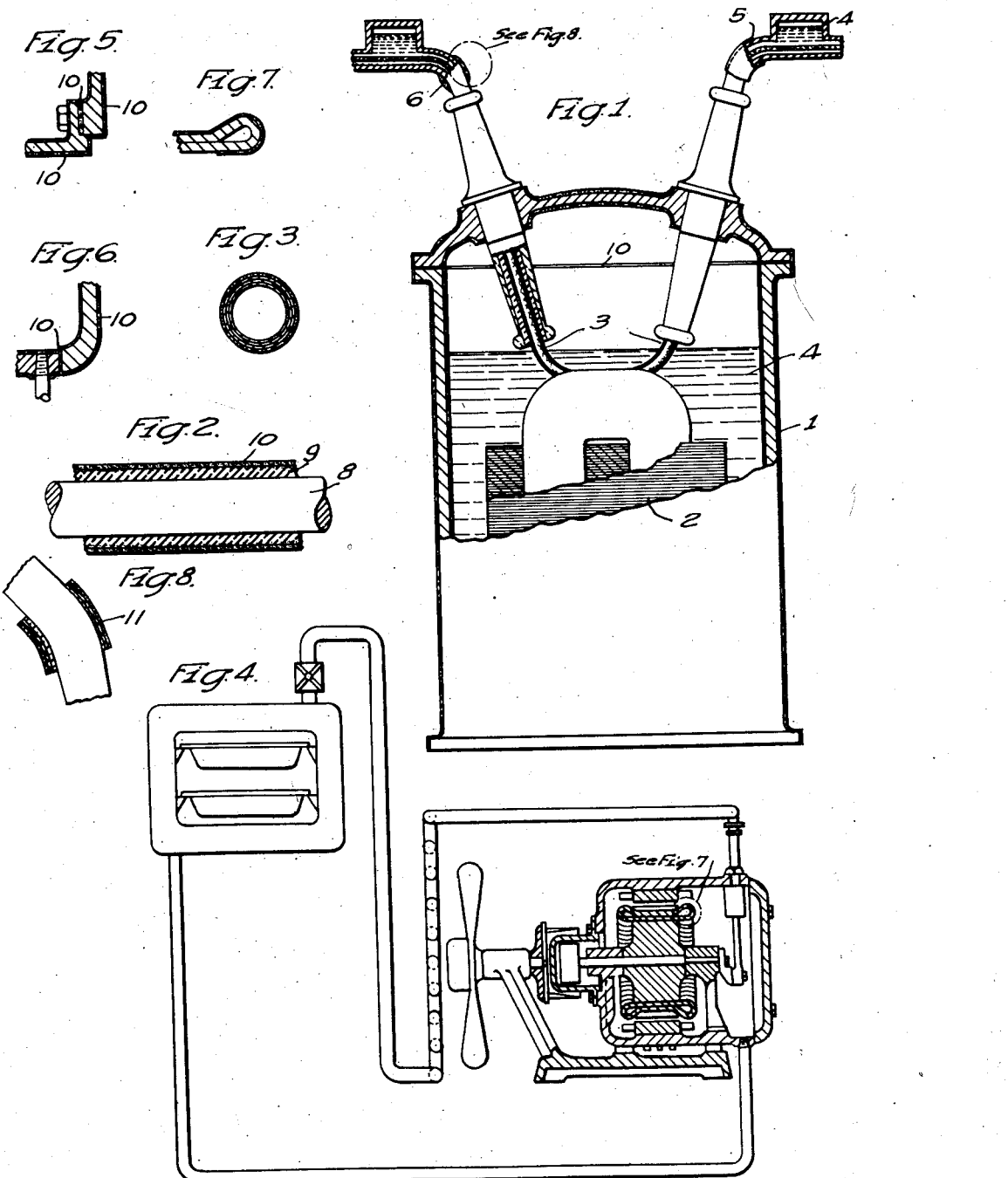

1,994,911

UNITED STATES PATENT OFFICE 1,994,911

CORROSION-RESISTING PRODUCT

James G. Ford, Forest Hills, Pa., assignor to Westinghouse Electric & Manufacturing Company, East Pittsburgh, Pa., a corporation of Pennsylvania Application February 15, 1933, Serial No. 656,853

21 Claims. (Cl. 175—361)

This invention relates to corrosion-resistant combinations, particularly such as are useful against deteriorative attack of hydrocarbons.

For example, reference is made to insulation to withstand halogenated fluid of dielectric nature, as is applicable to a metal conductor covered by cotton or other cellulosic wrapping. For different reasons such conductors are coming to be used in conjunction with various halogenated fluids, for example, where such fluids serve as insulating and cooling liquid in transformers; or, for further example, where such liquids serve as heat transfer media as in refrigeration systems, or in lubrication systems.

Serious obstacle appears to the use of such fluids because of their tendency to develop corrosive attack against most materials with which they contact. Ferrous metals as well as copper become corroded. Not only is the metal itself impaired but often the products of corrosion contaminate the surrounding liquid and in some cases even accelerate further attack. This may be manifested by impairment of the electrical resistance of the insulation, or it may be manifested by increased mechanical wear. Cellulosic materials are attacked, apparently by alteration of the cell or fibre structure. Likewise, resinous coatings or impregnating agents such as shellac, synthetic resins, bitumin, paraffin and many other materials, quite universally dissolve or become dispersed in the hydrocarbon, as for example, in the halogenous dielectric or heat transfer fluids.

It is among the objects of this invention to overcome defects of this sort, and to improve supporting material, whether metallic, resinous, cellulosic, rubber or composition so as to increase the usefulness thereof in combination with corrosive hydrocarbon fluid, as for example, halogenated heat transfer medium. Specific objects are to render various supporting agents resistant to deterioration in the presence of particular mixtures of chlorinated hydrocarbons, as of chlorinated diphenyl and trichlorbenzene.

Another object is to combine supporting materials with dielectric medium in a manner to utilize surrounding heretofore corrosive fluids for improving the electrical insulation efficacy of the combination.

A more particular object is to utilize trichlorobenzene and other halogenated hydrocarbons to render fibrous, cellular or rubbery material of improved resistance to deterioration by halogenated fluid.

These and other objects appear more fully in the following description and accompanying drawing illustrative of this invention.

This invention is predicated on my discovery that particularly intimate and corrosion-resistant combinations are formed between supporting structures of various cellulosic, resinous, metallic, rubbery or composition nature and polymerized halogen substitution product of vinyl acetate.

In the accompanying drawing of illustrative specific embodiments of this invention;

Fig. 1 shows in section a transformer and related elements associated with the halogenated resin according to this invention;

Fig. 2 shows a metallic conductor surrounded by insulating wrapping in combination with this protective agent;

Fig. 3 shows in cross section a unitary tubular structure, such as a hose, of fibrous material combined with this protective agent;

Fig. 4 shows conventionally a cooling system, such as for refrigeration, with a container and pump elements and motor windings protected against corrosion according to this invention;

Figs. 5 and 6 show joints and gaskets incorporating protective agent according to this invention;

Fig. 7 is an enlarged elevation of a portion of motor winding or the like such as indicated within dot and dash circle of Fig. 4.

Fig. 8 is an enlarged section through a taped joint embodying this invention, as indicated in dot and dash circle of Fig. 1.

In a preferred specific embodiment of this invention that will serve for illustration without implying restriction, various supporting structures are brought into intimate association with polymerized chlorine substitution product of vinyl acetate. Preferably this is accomplished through the medium of dispersing agents of somewhat volatile nature, and preferably also such as are capable of swelling the vinyl product.

Referring more specifically to the accompanying drawing, Fig. 1 shows a transformer tank 1 with transformer elements 2 and conducting leads 3 in contact with cooling and insulating halogeneous hydrocarbon liquid 4. Associated with the transformer are shown cables 5 of oil-filled type, but containing dielectric 4 instead of oil. Cable 5 is connected to conductor leads 3 by a taped joint 6, indicated by dot and dash circle and shown in enlarged section in Fig. 8. In the drawing throughout as in the walls and windings of Fig. 1, insulating and protective combinations comprising the polymerized halogen vinyl acetate product are indicated by heavy lines on portions exposed to the hydrocarbon.

Fig. 2 illustrates an embodiment of this invention somewhat more in detail. Metallic conductor 8 is shown surrounded by insulation 9, in section, as of cotton impregnated with this material 10, which for convenience may be termed co-polymerized vinyl chloracetate. In some measure this material penetrates the cellular wrapping.

Fig. 3 illustrates a combination of fibrous material, preferably of cellular or of cellulosic nature, intermingled with this polymerized vinyl acetate derivative, and formed as a tubing or as laminated pressed structures such as condenser bushings. For example, to cloth or paper tape this derivative may be applied in acetone solution, preferably containing some amount of halogenated naphthalene, as halowax or chlorinated naphthalenes, for plasticizing effect. Or this vinyl derivative may be applied with trichlorobenzene, which serves to swell the material and so tighten the wrappings. Instead of cloth or paper, finely divided material may be molded, as cork or sawdust or chopped cloth or paper. Tubing of this sort is resistant against such hydrocarbons as gasoline or crude oil or lubricating oil, and also against halogenated liquids for instance against a mixture of about fifty percent trichlorobenzene and fifty percent chlorinated diphenyl, or against chlorinated diphenyl alone, or against fluorinated hydrocarbons, for example, dichlorodifluoromethane, or tetrachlorodifluoroethane, to mention various of the more recently used special hydrocarbons. Or such tubing is useful for transfer of fluid containing hydrocarbons, such as air or steam containing oil or gasoline.

Fig. 4 illustrates broadly a cooling system, such as for refrigeration purposes, where corrosive fluids are circulated. For example, fluorinated hydrocarbons are used, such as various fluorinated hydrocarbons of the sort disclosed in Midgley Patent 1,833,847. Such materials develop tendencies to attack metal parts, motor windings, and the like. One difficulty is that metal corroding or scaling into the circulating hydrocarbon tends to score moving mechanical parts, such as compressor cylinders. A particularly useful embodiment of this invention provides such system having the interior walls of the metal container combined with polymerized halogen substitution product of vinyl acetate. Further improvement follows impregnation of the motor windings likewise, as shown in Fig. 7.

Figs. 5 and 6 illustrate joints in which this polymerized product 10 is applied in plastic condition, as with chlorinated naphthalene, or with the chlorobenzene, for sealing purposes. Sheets of exceptional value for gasket purposes are available, comprising this polymerized vinyl chloracetate product. Such joints are applicable to contain fluorinated or otherwise halogenated nonflammable heat-transfer liquids such as have been proposed for turbine lubricating systems.

Fig. 8 illustrates a modification in which tape 11 is produced and used at joints requiring strength and sealing capacity against leakage. Such tape is produced by including some small amount of trichlorobenzene or other slowly volatile swelling agent.

Further illustration of the principles of this invention is found in the following specific description.

Various resins have been suggested for resistance or insulating purposes, but in trial they have proved to be attacked by hydrocarbons, even to marked extent by parious halogenated hydrocarbons. However polymerized halogen substitution product of vinyl acetate exhibits marked ability to withstand solvent and dispersive attack by such fluids, even at elevated temperatures. Especially is there such intimate association between metal, cellular or cellulosic material, rubber or composition structure and polymerized chlorine substitution product of vinyl acetate. In practice it has proved suitable to utilize such polymerized vinyl acetate product containing about 28.5 percent chlorine. Such product is known in the art as Mowolith G resin. Some of its properties further are water white color, ability to soften at about 100° C., solubility in acetone, ethyl acetate, amul acetate, butyl acetate, methyl glycol, ethyl glycol, ethyl glycol acetate, but insolubility in methyl alcohol, ethyl alcohol, petroleum hydrocarbons, benzol, toluol, trichlorobenzene, chlorinated diphenyl, chlorinated naphthalenes, dichlorodifluoromethane, dichlorotetrafluoroethane, and numerous halogenated hydrocarbons of the aliphatic and aromatic series. In some cases, as with trichlorobenzene, some slight swelling is effected, as is sufficient to increase the tightness of a joint in which this polymerized chlorine substitution product of vinyl acetate is utilized, yet flow and dispersion are avoided despite contacting, otherwise corrosive, hydrocarbons. Moreover, finely divided solid particles may be added, of the order of fineness of segments, without deleteriously affecting the plastic flow or dispersion of this material.

A specific example for application of a desirable embodiment of this invention is:

0.46 gallons ethyl acetate
0.37 gallons acetone
2.6 pounds polymerized halogen substitution product of vinyl acetate (Mowolith G, chlorine substitution product)
2.4 pounds aluminum oxide (300 mesh)
0.14 pounds ferric oxide (300 mesh)

These may be intimately dispersed mechanically, as in a ball mill.

Such a mixture is particularly useful for combining with the metal walls or with cellulosic material on the coils of transformers in conjunction with cooling dielectrics of halogenated nature, such as mixtures of trichlorobenzene, chlorinated naphthalene, tetrachlorodifluoroethane, and diphenyl derivatives.

According to the provisions of the patent statutes, I have explained the principle and mode of operation of this invention and have illustrated what I now consider to represent its best embodiment. However, I desire to have it understood that within the scope of the appended claims, the invention may be practiced otherwise than as specifically illustrated and described.

I claim as my invention:

1. In combination, a container, hydrocarbon therein, and corrosion resistant material exposed to the hydrocarbon and comprising polymerized halogen substitution product of vinyl acetate.

2. In combination, a container, halogenated hydrocarbon therein and corrosion resistant material exposed to the hydrocarbon and comprising polymerized chlorine substitution product of vinyl acetate.

3. In combination, metal, cellular covering therefor and intimately associated with the cellular material, protecting agent comprising polymerized halogen substitution product of vinyl acetate.

4. In combination, metal, cellular covering therefor and intimately associated with the cellular material, protecting agent comprising polymerized chlorine substitution product of vinyl acetate.

5. In combination a metal conductor, cellulosic covering therefor and intimately associated with the cellulosic material, protecting agent comprising polymerized halogen substitution product of vinyl acetate.

6. Electrical apparatus comprising a container, insulated electrically operative elements therein, hydrocarbon dielectric surrounding the electrical elements, and protective agent against corrosion intimately in contact with at least the surface of the electrical elements and comprising polymerized halogen substitution product of vinyl acetate.

7. A transformer comprising a tank, transformer windings therein, and protecting agent against corrosion incorporated in at least the surface of the windings and comprising polymerized chlorine substitution product of vinyl acetate.

8. Electrical apparatus comprising a container, insulated electrical windings movably operative therein, hydrocarbon fluid in contact with the windings, and protective agent against corrosion intimately in contact with at least the surface of the electrical windings and comprising polymerized chlorine substitution product of vinyl acetate.

9. A cooling system comprising a metal container, hydrocarbon liquid therein, a pump system to circulate the hydrocarbon liquid, and protective agent against corrosion intimately in contact with at least the surface of the container to minimize introduction of products from the container into the hydrocarbon and into the pump system.

10. A cooling system comprising a metal container, hydrocarbon liquid therein, a pump system to circulate the hydrocarbon liquid, electrical windings movably operative therein, and protective agent against corrosion intimately in contact with at least the surface of the windings to minimize introduction of products into the hydrocarbon and into the pump system.

11. Electrically insulating tape of cellular base, intimately associated with polymerized chlorine substitution product of vinyl acetate.

12. In combination, halogenated hydrocarbon fluid and polymerized chlorine substitution product of vinyl acetate.

13. In combination, cellulosic material and polymerized halogen substitution product of vinyl acetate.

14. A product of manufacture comprising cellulosic base intermingled with halogenated hydrocarbon, and polymerized halogen substitution product of vinyl acetate.

15. A product of manufacture comprising cellulosic base intermingled with chlorinated hydrocarbon, and polymerized chlorine substitution product of vinyl acetate.

16. In combination a container, fluorinated hydrocarbon therein, and corrosion resistant material exposed thereto comprising polymerized halogen substitution product of vinyl acetate.

17. In combination a container, tetrachlorodifluoroethane therein, and corrosion resistant material exposed thereto comprising polymerized chlorine substitution product of vinyl acetate.

18. Means for protecting bodies from the action of corrosive fluids comprising a coating or impregnation of protective material including polymerized halogen substitution product of vinyl acetate.

19. Means for protecting bodies from the action of corrosive fluids comprising a coating or impregnation of protective material including polymerized halogen substitution product of the vinyl acetate.

20. In combination, an electrical apparatus having metallic conductors and insulation thereon, a liquid surrounding said apparatus and a protection for said apparatus from the action of said liquid, said protection including a body of protective material comprising polymerized halogen substitution product of vinyl acetate.

21. In combination, a tank, an electrical apparatus within said tank, leads from said apparatus to the exterior of said tank, insulation separating said apparatus and said leads from said tank, a liquid in said tank covering said apparatus and a protective material separating said protective material comprising polymerized halogen substitution product of vinyl acetate.

JAMES G. FORD.